United States Patent
Tagawa et al.

[11] Patent Number: 6,094,325
[45] Date of Patent: Jul. 25, 2000

[54] SPIN VALVE HEAD REDUCING BARKHAUSEN NOISE

[75] Inventors: Ikuya Tagawa; Kenichiro Yamada; Yuji Uehara, all of Kanagawa, Japan

[73] Assignee: Fujitsu Limited, Kawasaki, Japan

[21] Appl. No.: 09/111,035

[22] Filed: Jul. 7, 1998

[30] Foreign Application Priority Data

Dec. 25, 1997 [JP] Japan .................................. 9-357511

[51] Int. Cl.$^7$ .................................................... G11B 5/39
[52] U.S. Cl. ................................................................ 360/113
[58] Field of Search ............................................. 360/113

[56] References Cited

U.S. PATENT DOCUMENTS

| | | | |
|---|---|---|---|
| 5,528,440 | 6/1996 | Fontana et al. | 360/113 |
| 5,883,764 | 3/1999 | Pinarbasi | 360/113 |
| 5,936,810 | 8/1999 | Nakamoto | 360/113 |

FOREIGN PATENT DOCUMENTS

| | | |
|---|---|---|
| 8235542 | 9/1996 | Japan . |
| 8287426 | 11/1996 | Japan . |
| 8293107 | 11/1996 | Japan . |
| 09016918 | 1/1997 | Japan . |
| 09016923 | 1/1997 | Japan . |
| 9153652 | 6/1997 | Japan . |

*Primary Examiner*—A. J. Heinz
*Attorney, Agent, or Firm*—Greer, Burns & Crain, Ltd.

[57] ABSTRACT

A spin valve head comprises a spin valve film having at least a pinned magnetic layer, a nonmagnetic metal layer, and a free magnetic layaer. The spin valve head further comprises a hard magnetic layer for controlling magnetic domains of the free magnetic layer, and electrode elements for supplying a sense current to the spin valve film, wherein the hard magnetic layer and the free magnetic layer are positioned not to overlap an orthographic projection of the hard magnetic layer in a thickness direction of the spin valve film with an orthographic projection of the free magnetic layer in the thickness direction of the spin valve film. According to such configuration, a single magnetic domain structure which does not generate a reverse magnetic field region throughout the overall surface of the free magnetic layer can be obtained, so that the hysteresis phenomenon is not caused in the spin valve head output. Therefore, the output with no noise can be derived.

7 Claims, 13 Drawing Sheets

ENLARGED SECTIONAL VIEW SHOWING PERTINENT PORTION OF A CONFIGURATION OF A SPIN VALVE HEAD ACCORDING TO A FIRST EMBODIMENT

FIG. 1A (PRIOR ART)
FIG. 1B (PRIOR ART)
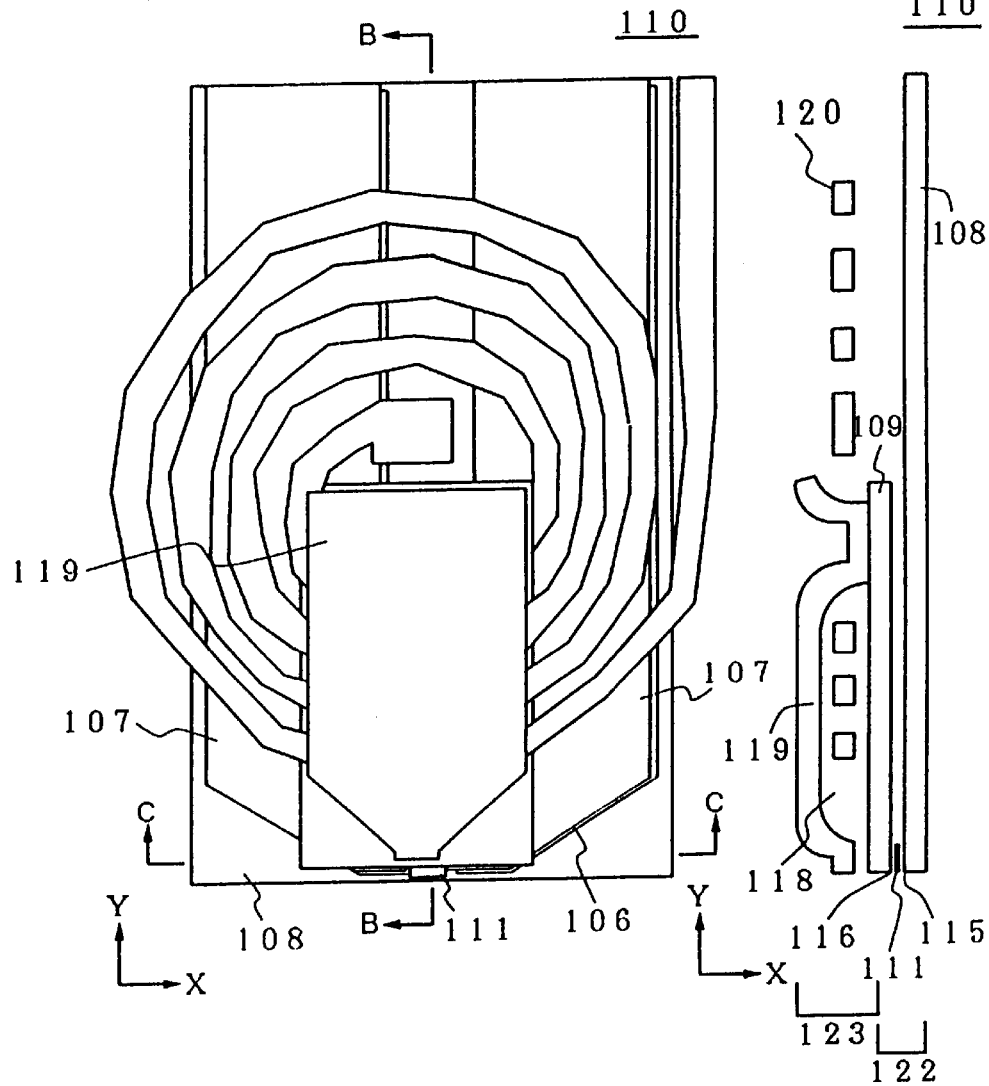
FIG. 1C (PRIOR ART)
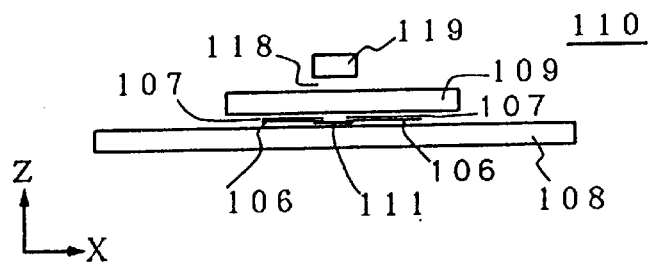
ENTIRE CONFIGURATION OF SPIN VALVE HEAD

FORMING SPIN VALVE FILM

FORMING RESIST

ION MILLING

FILM FORMATION

LIFT-OFF

SECTIONAL VIEWS SHOWING STEPS OF MANUFACTURING SPIN VALVE HEAD

MAIN PART OF SPIN VALVE HEAD

ANALYZING THE CONFIGURATION OF SPIN VALVE HEAD

ENLARGED SECTIONAL VIEW SHOWING PERTINENT PORTION OF A CONFIGURATION OF A SPIN VALVE HEAD ACCORDING TO A FIRST EMBODIMENT

SCHEMATIC VIEW SHOWING THE CONTENT OBTAINED BY ANALYZING THE CONFIGURATION OF THE SPIN VALVE HEAD

FORMING RESIST

ION MILLING

LIFT OFF

SECTIONAL VIEWS SHOWING STEPS OF MANUFACTURING THE SPIN VALVE HEAD

SPIN VALVE HEAD ACCORDING TO A SECOND EMBODIMENT

F I G. 13
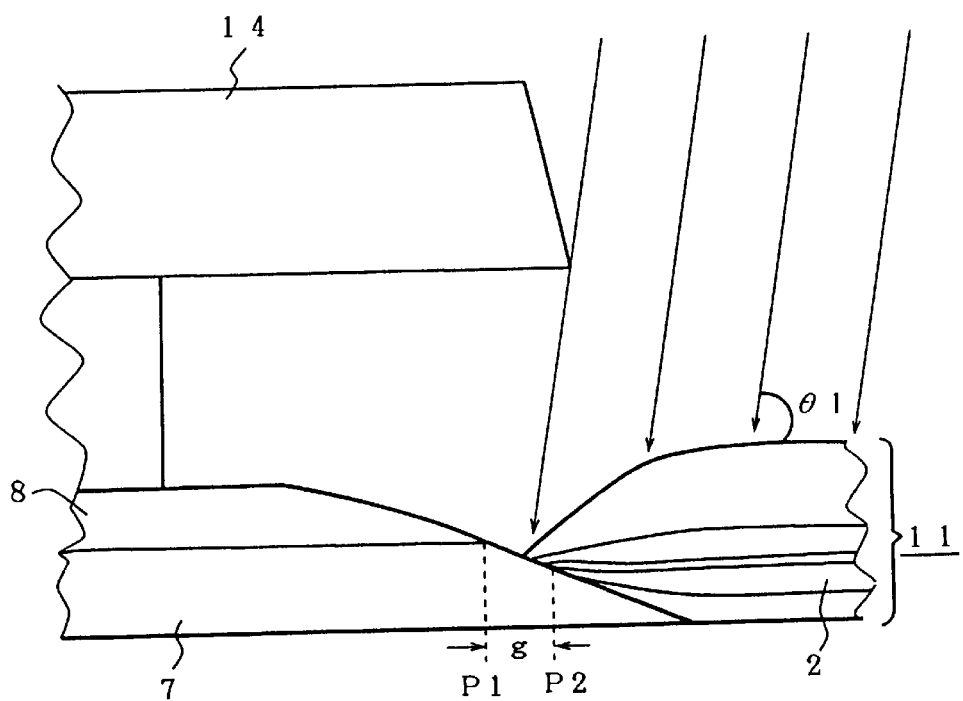
SPIN VALVE HEAD ACCORDING TO A THIRD EMBODIMENT

SPIN VALVE HEAD ACCORDING TO A FOURTH EMBODIMENT

F I G. 15
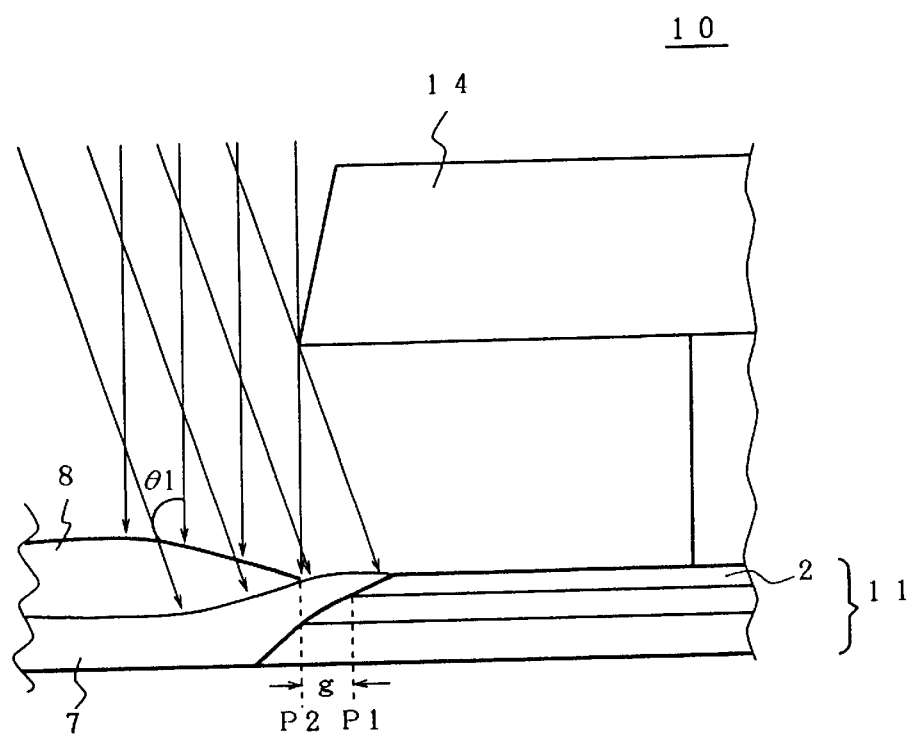
SPIN VALVE HEAD ACCORDING TO A FIFTH EMBODIMENT

SPIN VALVE HEAD ACCORDING TO A SIXTH EMBODIMENT

PLAN VIEW SHOWING A MAGNETIC DISK DRIVE
USING THE SPIN VALVE HEAD SHOWN IN FIG. 7

SPIN VALVE HEAD REDUCING BARKHAUSEN NOISE

FIELD OF THE INVENTION

The present invention relates to a spin valve head and a method of manufacturing the same, and a magnetic disk drive using the spin valve head.

BACKGROUND OF THE INVENTION

Prior Art-related Description

In this 1966, a surface recording density of the hard disk drive (HDD) has been in excess of 1 Gbit/square inches. It is an MR (magnetoresistive) head having a reproducing output higher than the conventional thin film head that acts as a motive power. However, for several recent years, the surface recording density of the HDD has continued to increase at the rate of 60% a year, for example.

According to the request to continue to improve the sensitivity of the magnetic head, the giant magnetoresistive film (GMR film) which can output a high read signal has been watched with interest. Since the spin valve magnetoresistive film can be formed relatively easily because of its relatively simple structure and the rate of change of the electric resistance at a low magnetic field is higher than the normal MR device, recently attention has been paid to the spin valve magnetoresistive film out of the GMR films.

The MR head uses an MR film whose resistance is varied by applying the external magnetic field as a reproducing head. The magnetic field (external magnetic field) generated from the recording medium is detected as the resistance change and then output as the voltage change. In the GMR head, the MR film is replaced with the GMR film.

The magnetic heads using the spin valve magnetoresistive film (referred to as the "spin valve head" hereinafter) have been set forth in U.S. Pat. No. 5,206,590, Japanese Patent Application Publication (KOKAI) Hei 6-60,336, and French Patent FR No.95-5,699.

FIG. 1A is a schematic plan view showing an example of such spin valve head, FIG. 1B is a sectional view showing a sectional structure taken along a line B—B in FIG. 1A, and FIG. 1C is a sectional view showing a sectional structure (structure opposing to the recording medium) taken along a line C—C in FIG. 1A.

As shown in FIG. 1B, a spin valve head 110 is a composite magnetic head. The composite magnetic head comprises a reproducing head 122 and a recording head 123 if classified roughly, and is formed as a piggyback structure in which the recording head 123 is attached on a back portion of the reproducing head 122. An upper reproducing shielding 109 of the reproducing head 122 and a lower recording magnetic pole (lower core) 109 of the recording head 123 are used commonly as a merge type magnetic head.

As shown in FIGS. 1B and 1C, the reproducing head 122 uses a spin valve film 111. The reproducing head 122 comprises the spin valve film 111, a lower reproducing shielding 108 arranged via the spin valve film 111 and a lower reproducing gap film (insulating layer) 115, and an upper reproducing shielding 109 arranged via an upper reproducing gap film (insulating layer) 116.

The recording head 123 comprises a recording coil 120, a recording gap film (insulating layer) 118 for surrounding the recording coil 120, a lower recording magnetic pole (upper magnetic pole) 109 placed on both sides of the insulating layer, and an upper recording magnetic pole (upper core) 119. The recording coil 120 is buried in the insulating layer 118.

In this manner, the reproducing head 122 and the recording head 123 are formed integrally with each other in the composite magnetic head. But normally the composite magnetic head in which the spin valve head 110 is employed as the reproducing head 122 is called the "spin valve head" 110 simply as a whole.

FIG. 1C is a sectional view of a sectional structure of the spin valve head 110 if viewed from the recording medium side (not shown). Upper and lower gap films (insulating films) 115, 116 are provided between the lower reproducing shielding 108 and the upper reproducing shielding 109. The spin valve head 110 is placed in a window between these insulating films.

The spin valve head 110 is patterned into a planar rectangle after film formation, and a hard film 106 and electrode terminals 107 are formed in two regions near both ends of the uppermost layer respectively, whereby the spin valve head 110 is finished.

In such a spin valve head 110, an area formed between a pair of electrode terminals 107 provided on both sides of the spin valve film 111 can act as a signal detecting region (sense region).

In this disclosure, for convenience of explanation, in order to specify easily the magnetization direction in the context of the spin valve head 110, a thickness direction of the spin valve film 111 (laminating direction) is defined as a Z-direction, a direction connecting the pair of electrodes 107 is defined as an X-direction, and a direction which intersects orthogonally with a Y-Z plane is defined as a Y-direction, as shown in Figures.

Manufacture of the spin valve head 110 as shown in FIGS. 1B and 1C is carried out in brief according to the following steps.

(1) Formation of the lower reproducing shielding 108
(2) Formation of the lower reproducing gap film 115
(3) Formation/patterning of the spin valve film 111, and formation of the electrode film 107
(4) Formation of the upper reproducing gap film 116
(5) Formation of the upper reproducing shielding/lower recording magnetic pole 109
(6) Formation of the recording gap film 118
(7) Formation of the recording coil 117
(8) Formation of the upper recording magnetic pole 119
(9) Formation of the protection film FIGS. 2A to 2D are views showing the above step (3) of forming/patterning the spin valve film 111 and forming the electrode film 107 out of the steps of manufacturing such a spin valve head 110 in brief.

As shown in FIG. 2A, the spin valve film 111 is formed on the substrate (i.e., the lower reproducing gap film consisting of the insulating layer) and then thereon is formed a resist 114 having a two-layered overhanged structure consisting of a resist 112 and alumina 113.

Then, as shown in FIG. 2B, the spin valve film 111 is patterned into a planar rectangle by virtue of ion milling.

Then, as shown in FIG. 2C, the hard film 106 and the electrode film 107 are formed.

Finally, as shown in FIG. 2D, the resist 114 having a two-layered overhanged structure is lifted off. Thereafter, the process continues to the step of forming the upper reproducing gap film.

FIG. 3 is an enlarged sectional view equivalent to a portion enclosed with a circle in FIG. 2D in an enlarged fashion. In other words, FIG. 3 is a fragmentarily enlarged view showing a junction portion between the spin valve film 111 and one of the electrode terminals 107 when viewed from the recording medium.

The spin valve film 111 is formed over the lower reproducing shielding 108 via the lower reproducing gap film (insulating film) 115. The spin valve film 111 has an underlying layer 101, a free magnetic layer (free layer) 102, a nonmagnetic metal layer 103, a pinned magnetic layer (pined layer) 104, and an antiferromagnetic layer 105. A hard magnetic layer (hard film) 106 and an electrode film 107 formed on the hard film 106 are formed in the neighborhood of the side end portion of the spin valve film 111. The upper reproducing shielding 109 is provided over the spin valve film 111 and the electrode film 107 via the lower reproducing gap film (insulating film) 116.

In such spin valve head 110, the antiferromagnetic layer 105 is provided on the pinned layer 104 and then the pinned layer 104 is magnetized by the antiferromagnetic layer 105 in a direction opposite to the magnetization direction of the antiferromagnetic layer 105. Magnetic domains of the free layer 102 are controlled by the electrostatic magnetic field generated from a pair of hard films 106 arranged near the both ends of the free layer 102 to be directed in one direction.

Study of Problems of the Above Spin Valve Made by the Inventors

However, in the spin valve head 110 in the prior art as shown in FIG. 3, such a problem has arisen that Barkhausen noises are generated in the output of the spin valve head in response to the signal magnetic fields.

The inventors of the present invention have studied the cause of generation of Barkhausen noises based on the configuration of the spin valve head 110 shown in FIG. 3. For the magnetic domain control, since magnetic domains of the pinned layer 104 are controlled very strongly by a negative exchange interaction of the antiferromagnetic layer 105 which is coated on the overall surface of the pinned layer 104, no troubles occur in the pinned layer 104. In contrast, the magnetic domains of the free layer 102 are controlled very weakly by the hard film 106 placed only on both sides of the free layer 102. Therefore, it has become an issue whether or not the magnetic domains of the free layer 102 are controlled ideally by the hard film 106. Subsequently, if the configuration of the spin valve head 110 shown in FIG. 3 has been studied, a positional relationship between the free layer 102 and the hard film 106 has been able to be supposed as the cause for the above.

FIG. 4 is a schematic view showing the positional relationship between only the free layer 102 and the hard film 106 of the spin valve head 110 shown in FIG. 3. Where the magnetization direction of the hard film 106 is directed from the left side to the right side on the sheet of FIG. 4, therefore the magnetic domains of the free layer 102 are also controlled to be directed from the left side to the right side on the sheet of FIG. 4.

As shown in FIG. 4, it is to be understood that, in the spin valve head 110, the hard film 106 is formed to overlap with a part of the free layer 102 of the spin valve film along the Z-direction (thickness direction of the spin valve film). According to such hard film 106, magnetic charges of the hard film 106 are concentrated onto a top end portion of the hard film on the free layer side. As a result, it has been found that, in the region of the free layer 102 beneath the hard film 106, the direction of the magnetic field generated from the concentrated magnetic charges radially is directed oppositely to the free layer magnetization direction and thus there exists "reverse magnetic field region". Then, the inventors have examined the law of cause and effect between the presence of this reverse magnetic field region and the generation of the Barkhausen noise.

FIG. 5 is a view showing the distribution of magnetization in the free layer plane of the spin valve film 102 obtained by virtue of micromagnetics simulation. As shown in FIG. 5, the magnetization direction in the reverse magnetic field region where a part of the hard films 106 are overlapped is directed largely differently from the magnetization direction in the vicinity of the central portion. In other words, it has been understood that "magnetic domain control incomplete regions" exist in the free layers 102 which overlaps with a pair of hard films 106 respectively. FIG. 5, the magnetic domain control incomplete region on the left side corresponds to the reverse magnetic field region shown in FIG. 4, while the magnetic domain control incomplete region on the right side corresponds to the reverse magnetic field region omitted from FIG. 4.

FIG. 6 shows the response output voltage characteristic of the spin valve head, which has the incomplete single magnetic domain state (i.e., a number of magnetic domain state) having various magnetic field directions, to the recording medium signal magnetic field, obtained by virtue of the micromagnetics simulation. It is appreciated from FIG. 6 that, in the output voltage characteristic, very apparent hysteresis phenomenon has appeared in the range of the recording medium magnetic field from −150 to 120 oersted (Oe).

More particularly, if an external magnetic field is applied to the free layer 102 in the situation that a number of magnetic domains (i.e., small area having the same magnetization direction) exist in the free layer 102, the magnetization directions are rotated all at once so that the magnetization directions in the free layer are directed in one way uniformly. That is, a number of magnetic domains are changed to a single magnetic domain. It has been found that, if such spin valve film is employed as the magnetic head, the Barkhausen noise is superposed on the output waveform.

Hence, in order to prevent the Barkhausen noise, the inventors have examined a means for suppressing fluctuation of the magnetization direction in the free layer and for fixing always the free layer as a single magnetic domain.

SUMMARY OF THE INVENTION

Therefore, it is an object of the present invention to provide a spin valve head which is capable of reducing a noise.

It is another object of the present invention to provide a method of manufacturing a spin valve head which is capable of reducing a noise.

It is still another object of the present invention to provide a magnetic disk drive using a spin valve head which is capable of reducing a noise.

According to the present invention, there is provided a spin valve head comprising:

a spin valve film having at least a pinned magnetic layer, a nonmagnetic metal layer, and a free magnetic layer;

a hard magnetic layer for controlling magnetic domains of the free magnetic layer; and electrode elements for supplying a sense current to the spin valve film;

wherein the hard magnetic layer and the free magnetic layer are positioned not to overlap an orthographic projection of the hard magnetic layer in a thickness direction of the spin valve film with an orthographic projection of the free magnetic layer in the thickness direction of the spin valve film.

As described later, the spin valve film is provided having the pinned magnetic layer, the nonmagnetic metal layer and the free magnetic layer, the hard magnetic layer, and the electrode elements, all being indispensable for the spin valve head, wherein the orthographic projection of the hard magnetic layer in a thickness direction of the spin valve film is not overlapped with the orthographic projection of the free magnetic layer in the thickness direction of the spin valve film.

By employing such configuration, the free magnetic layer can be formed as the single magnetic domain in which no reverse magnetic field region occurs, so that the hysteresis phenomenon is not caused in the output of the spin valve head. Accordingly, the output without noise can be output from the spin valve head.

According to the present invention, there is provided a spin valve head comprising:

a spin valve film having at least an antiferromagnetic layer, a pinned magnetic layer whose magnetization direction is pinned with the antiferromagnetic layer, a nonmagnetic metal layer, and a free magnetic layer whose magnetization is rotated by signal magnetization from a recording medium;

a hard magnetic layer for controlling magnetic domains of the free magnetic layer;

electrode elements for supplying a sense current to the spin valve film; and two magnetic shielding films for putting the spin valve film, the hard magnetic layer, and the electrode elements therebetween via insulating layers;

wherein the hard magnetic layer and the free magnetic layer are positioned such that an orthographically projected position of a top end portion of the hard magnetic layer located on a free magnetic layer side against the magnetic shielding films is positioned on an outside of orthographically projected positions of top end portions of the free magnetic layer located on both sides against the magnetic shielding films.

In the spin valve head according to the present invention, the orthographically projected position of the top end portion of the hard magnetic layer located on the free magnetic layer side against the magnetic shielding films and the orthographically projected positions of top end portions of the free magnetic layer located on both sides against the magnetic shielding films are positioned to have a clearance of more than zero therebetween.

According to the present invention, there is provided a magnetic disk drive having a spin valve head set forth as above.

According to the present invention, for example, in connection with FIG. 11, there is provided a method of manufacturing a spin valve head comprising the steps of:

forming a spin valve film having at least a pinned magnetic layer, a nonmagnetic metal layer, and a free magnetic layer on a substrate;

patterning the spin valve film into a planar rectangle to decide or define a top end portion of the free magnetic layer; and forming a hard magnetic layer and electrode elements in a neighborhood of a side end portion of the spin valve film;

wherein the hard magnetic layer is formed such that, if viewed from a thickness direction of the spin valve film, the hard magnetic layer does not overlap with the free magnetic layer.

In the preferred embodiment of the present invention, the step of patterning the spin valve film is executed by the step of patterning the spin valve film by virtue of ion milling using the overhanged resists to decide or define the top end portion of the free magnetic layer. The hard magnetic layer is formed by virtue of sputtering using the overhanged resists and, at that time, the hard magnetic layer is formed not to overlap with the free magnetic layer by controlling a sputtering incident angle if viewed from the thickness direction of the spin valve film.

According to the present invention, for example, in connection with FIG. 11, there is provided a method of manufacturing a spin valve head comprising the steps of:

forming an underlying layer, a free magnetic layer, a nonmagnetic metal layer, a pinned magnetic layer, and an antiferromagnetic layer on a substrate in this order to thus form a spin valve film;

forming overhanged resists on the spin valve film;

patterning the spin valve film by virtue of ion milling;

forming a hard magnetic layer and electrode elements in this order by virtue of sputtering; and lifting off the overhanged resists;

wherein the free magnetic layer which is decided by the step of patterning the spin valve film by virtue of ion milling and the hard magnetic layer which is decided or defined by the step of forming the hard magnetic layer by virtue of sputtering are formed not to overlap with each other if viewed from the thickness direction of the spin valve film.

According to the present invention, for example, in connection with FIG. 12, there is provided a method of manufacturing a spin valve head comprising the steps of:

forming an electrode film and a hard magnetic layer in this order on a substrate by virtue of sputtering;

patterning the electrode film and the hard magnetic layer;

forming an underlying layer, a free magnetic layer, a nonmagnetic metal layer, a pinned magnetic layer, and an antiferromagnetic layer on the patterned hard magnetic layer and the substrate in this order to thus form a spin valve film; and removing a portion of the spin valve film positioned above the hard magnetic layer;

wherein the hard magnetic layer which is decided or defined by the step of patterning the hard magnetic layer and the free magnetic layer which is decided or defined by the step of removing the portion of the spin valve film positioned above the hard magnetic layer are formed not to overlap with each other if viewed from the thickness direction of the spin valve film.

According to the present invention, for example, in connection with FIG. 13, there is provided a method of manufacturing a spin valve head comprising the steps of:

forming an electrode film and a hard magnetic layer in this order on a substrate by virtue of sputtering;

patterning the electrode film and the hard magnetic layer;

forming overhanged resists on the hard magnetic layer being patterned;

forming an underlying layer, a free magnetic layer, a nonmagnetic metal layer, a pinned magnetic layer, and an antiferromagnetic layer on the overhanged resists and the substrate in this order to thus form a spin valve film; and lifting off the overhanged resists;

wherein the hard magnetic layer which is decided by the step of patterning the hard magnetic layer and the free magnetic layer which is decided or defined by the step of forming the spin valve film are formed not to overlap with each other if viewed from the thickness direction of the spin valve film.

According to the present invention, for example, in connection with FIG. 14, there is provided a method of manufacturing a spin valve head comprising the steps of:

forming an underlying layer, an antiferromagnetic layer, a pinned magnetic layer, a nonmagnetic metal layer, and a free magnetic layer on a substrate in this order to thus form a spin valve film;

forming overhanged resists on the spin valve film;

patterning the spin valve film by virtue of ion milling;

forming a hard magnetic layer and an electrode film in this order by virtue of sputtering; and lifting off the overhanged resists;

wherein the free magnetic layer which is decided or defined by the step of patterning the spin valve film and the hard magnetic layer which is decided defined by the step of forming the hard magnetic layer by virtue of sputtering are formed not to overlap with each other if viewed from the thickness direction of the spin valve film.

According to the present invention, for example, in connection with FIG. 15, there is provided a method of manufacturing a spin valve head comprising the steps of:

forming an underlying layer, an antiferromagnetic layer, a pinned magnetic layer, a nonmagnetic metal layer, and a free magnetic layer on a substrate in this order to thus form a spin valve film;

forming overhanged resists on the spin valve film;

patterning the spin valve film by virtue of ion milling;

forming an electrode film and a hard magnetic layer in this order by virtue of sputtering; and lifting off the overhanged resists;

wherein the free magnetic layer which is decided or defined by the step of patterning the spin valve film by virtue of ion milling and the hard magnetic layer which is decided or defined by the step of forming the hard magnetic layer by virtue of sputtering are formed not to overlap with each other if viewed from the thickness direction of the spin valve film.

According to the present invention, for example, in connection with FIG. 16, there is provided a method of manufacturing a spin valve head comprising the steps of:

forming an underlying layer, an antiferromagnetic layer, a pinned magnetic layer, a nonmagnetic metal layer, and a free magnetic layer on a substrate in this order to thus form a spin valve film;

forming overhanged resists on the spin valve film;

patterning the spin valve film by virtue of ion milling;

forming an electrode film and a hard magnetic layer in this order by virtue of sputtering;

forming another electrode film on the hard magnetic layer by virtue of sputtering; and lifting off the overhanged resists;

wherein the free magnetic layer which is decided or defined by the step of patterning the spin valve film by virtue of ion milling and the hard magnetic layer which is decided or defined by the step of forming the hard magnetic layer by virtue of sputtering are formed not to overlap with each other if viewed from the thickness direction of the spin valve film.

According to the present invention, there is provided a magnetic disk drive having a spin valve head which is manufactured by a method of manufacturing the spin valve head set forth as above.

BRIEF DESCRIPTION OF THE DRAWINGS

FIG. 1 shows an entire configuration of a spin valve head, wherein FIG. 1A is a plan view showing a planar structure of the spin valve head, FIG. 1B is a sectional structure taken along a line B—B in FIG. 1A, and FIG. 1C is a sectional structure taken along a line C—C in FIG. 1A;

FIG. 13 is an enlarged sectional view showing a pertinent portion of a configuration of a spin valve head according to a third embodiment of the present invention;

FIG. 15 is an enlarged sectional view showing a pertinent portion of a configuration of a spin valve head according to a fifth embodiment of the present invention;

DESCRIPTION OF THE PREFERRED EMBODIMENTS

Embodiments of a spin valve head and a method of manufacturing the same, and a magnetic disk drive using the spin valve head according to the present invention will be explained with reference to the accompanying drawings hereinbelow. The same reference symbols are assigned to the same elements throughout the drawings and therefore their redundant explanations are omitted in this disclosure.

First Embodiment

Figure 7:
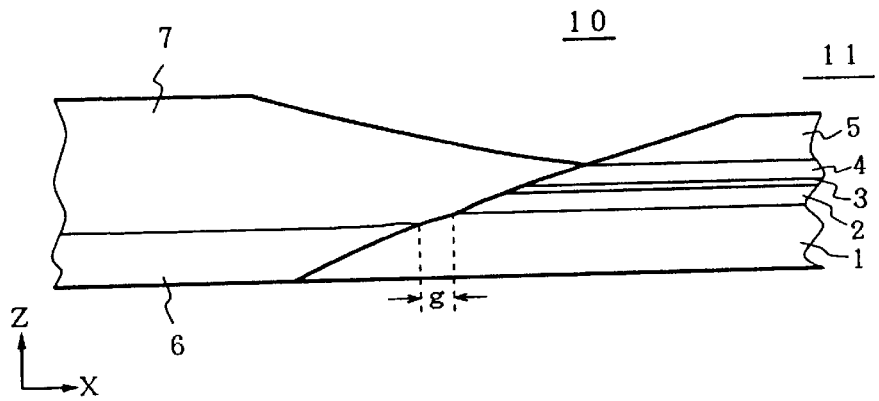
FIG. 7 is an enlarged sectional view showing a pertinent portion of a configuration of a spin valve head according to a first embodiment of the present invention.
Figure 8:
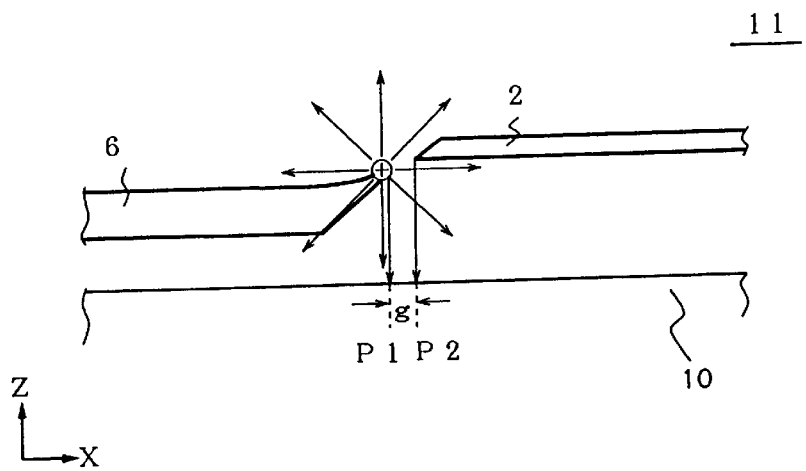
FIG. 8 is a schematic view showing the content obtained by analyzing the configuration of the spin valve head shown in FIG. 7.

FIG. 7 is an enlarged schematic sectional view showing mainly an abutted joint portion between a spin valve film 11 and a hard magnetic film (hard film) 6 of a spin valve head 10 according to a first embodiment of the present invention, which corresponds to a part of FIG. 8 showing the spin valve head in the prior art.

As shown in FIG. 7, the spin valve head 10 comprises an underlaying layer 1 made of a tantalum (Ta) film of about 50 Å thickness, a free magnetic layer (called also a "free layer") 2 made of an iron-nickel (NiFe) or cobalt-iron (Co90Fe10) film of about 75 Å thickness and formed on the underlaying layer 1, a nonmagnetic metal layer 3 made of a copper (Cu) film of about 30 Å thickness and formed on the free layer 2, a pinned magnetic layer (called also a "pinned layer") 4 made of a cobalt-iron (Co90Fe10) film of about 20 Å thickness and formed on the nonmagnetic metal layer 3, an antiferromagnetic layer 5 made of an iron-manganese (FeMn) or palladium-platinum-manganese (PdPtMn) film of 250 Å thickness and formed on the pinned layer 4, a hard magnetic layer (called also a "hard layer") 6 made of a cobalt-chromium-platinum (CoCrPt) film of 500 Å thickness and formed in the vicinity of the side end portion of the underlying layer 1, and an electrode film 7 made of a gold (Au) or tungsten (W) film of about 1000 Å thickness and formed on the hard film and near the side end portions of the free layer 2, the nonmagnetic metal layer 3 and the pinned layer 4.

The spin valve head in FIG. 7 differs from the spin valve head in the prior art (see FIG. 3) in that the underlying layer 1 is formed relatively thick and also iLs thicker than the hard layer 6.

Though not shown in FIG. 7, it should be noted that, as was the case with FIG. 3, a lower reproducing shielding is formed below the underlaying layer 1 via a lower reproducing gap film (insulating film) and an upper reproducing shielding is formed over the antiferromagnetic layer 5 via an upper reproducing gap film (insulating film).

Figure 2A:
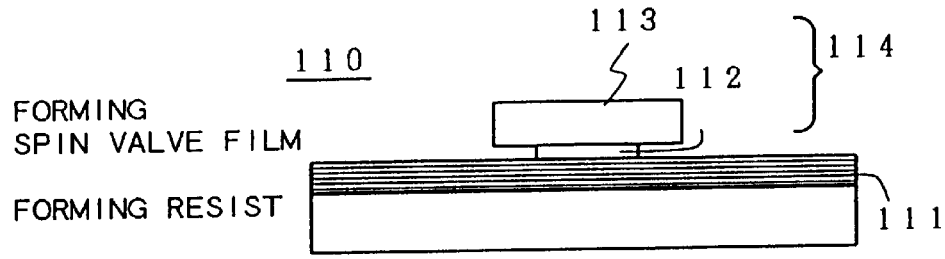
FIGS. 2A to 2D are sectional views showing steps of manufacturing a spin valve head in the prior art respectively.
Figure 2B:
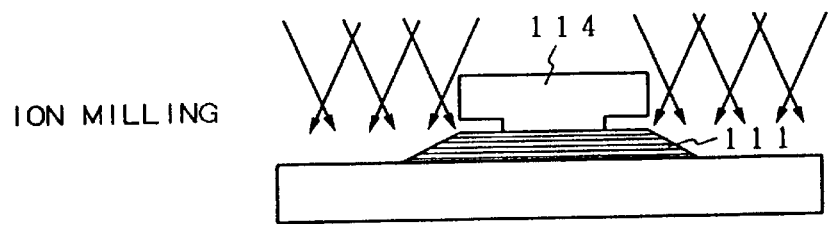
Figure 2C:
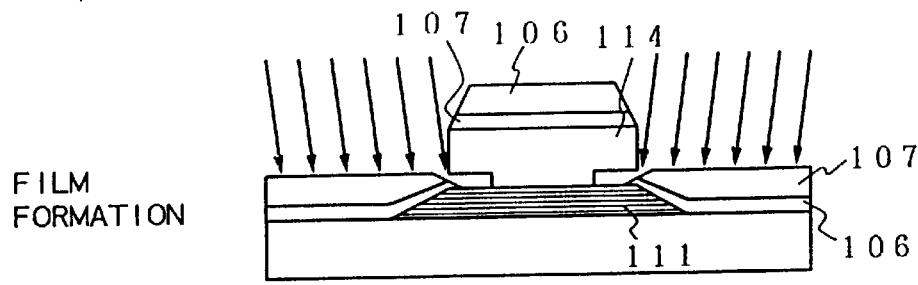
Figure 2D:
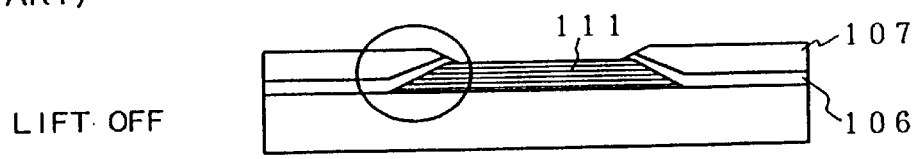
Figure 3:
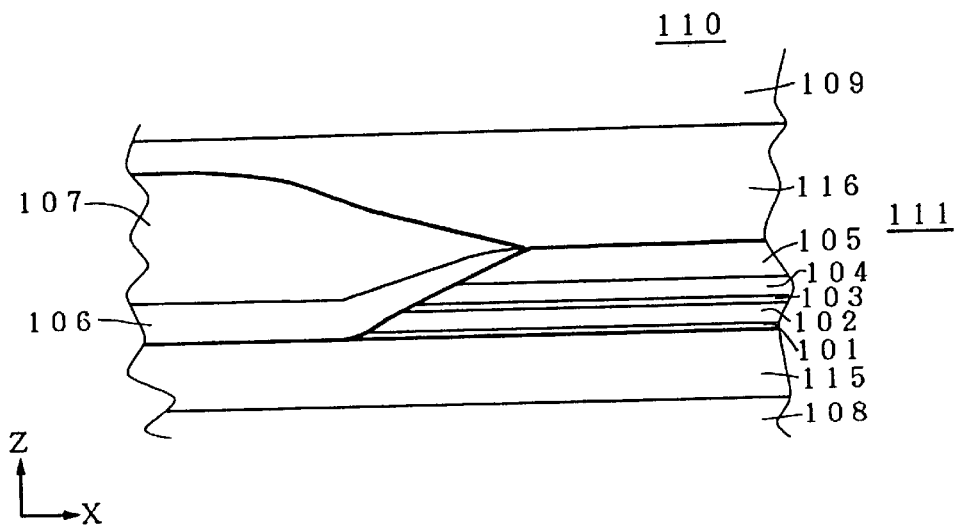
FIG. 3 is an enlarged sectional view showing a pertinent portion of a configuration of the spin valve head in the prior art manufactured by the manufacturing steps in FIGS. 2A to 2D.

In contrast to the spin valve film of the spin valve head 110 in the prior art shown in FIG. 3, the hard film 6 and the free layer 2 of the spin valve film 10 in FIG. 7 are not overlapped with each other along the Z-direction (thickness direction of the spin valve film), whereas the hard film 106 and the free layer 102 of the spin valve film 110 in FIG. 3 are overlapped with each other. Particularly, in the spin valve film 10 in FIG. 7, there is provided a clearance (g≧0) of more than zero between an orthographic projection of the hard film 6 onto the lower reproducing shielding and an orthographic projection of the free layer 2 onto the lower reproducing shielding. In contrast, in the spin valve film 110 in FIG. 3, the orthographic projection of the hard film 106 is overlapped with the orthographic projection of the free layer 102 not to provide the clearance therebetween.

Of the spin valve film 10, mainly the spin valve film 11 can function by the free layer 2, the nonmagnetic metal layer 3, the pinned layer 4, and the antiferromagnetic layer 5.

The spin valve film 11 utilizes a four-layer structure consisting of the free layer 2, the nonmagnetic metal layer 3, the pinned layer 4, and the antiferromagnetic layer 5. Two magnetic layers of the free layer 2 and the pinned layer 4 are separated by the thin nonmagnetic metal layer 3, and the antiferromagnetic layer 5 is provided on the pinned layer 4.

With this structure, the pinned magnetic layer 4 adjacent to the antiferromagnetic layer 5 is magnetized by negative exchange interaction in the direction opposite to the magnetization direction of the antiferro-magnetic layer 5 and then the magnetization direction of the pinned magnetic layer 4 is pinned.

In contrast, the magnetic domains of the other magnetic layer (free layer) 2 separated by the nonmagnetic metal layer 3 are controlled by the magnetostatic field generated from a pair of hard films 6 placed near both ends of the free magnetic layer 2 to be directed in one direction uniformly. However, the magnetic domain control in the free magnetic layer 2 is weak so that the magnetization direction therein is not fixed. In other words, the pinned magnetic layer 4 has a large force (coercive force) to maintain the magnetization direction once fixed but the free magnetic layer 2 has the small coercive force.

When an external magnetic field (i.e., signal magnetic field from the recording medium) is applied, the free layer 2 is magnetized to easily change the magnetization direction. When the magnetization direction of the free layer 2 is opposite to that of the pinned layer 4 by 180 degree, electric resistance of the spin valve film is at maximum. This is because electrons which are moving from the free layer 2 to the pinned layer 4 or vice verse are scattered with the interfaces between the nonmagnetic metal layer 3 and the free layer 2/the pinned layer 4.

If the magnetization directions of the free layer 2 and the pinned layer 4 are directed in the same direction, the scattering is hard to occur on the interfaces between the nonmagnetic metal layer 3 and the free layer 2/the pinned layer 4, so that the electric resistance of the spin valve film is at minimum. Like the above, the electric resistance of the spin valve film is in proportion to a cosine of an angle between the magnetization directions of the free layer 2 and the pinned layer 4 (cos θ).

Accordingly, if a constant current (sense current) is supplied between a pair of electrodes 7 (only one electrode is shown) formed on both ends of the spin valve film 11, change in the electric resistance of the spin valve film 11 caused by the external magnetic field can be detected as change in voltage.

The spin valve film 11 is formed on the underlying layer 1. The underlying layer 1 is provided to make a surface of the insulating film (not shown) formed therebelow even.

The antiferromagnetic layer 5 of the spin valve film 11 is not essential. The antiferromagnetic layer 5 has a function to fix the magnetization direction of the pin layer 4 adjacent to the antiferromagnetic layer 5. If the antiferromagnetic layer 5 is not provided, the magnetization direction of the pin layer is ready to be changed by the external magnetic field to lose the GMR effect. However, if the hard magnetic layer is employed as the pinned layer 4, the antiferromagnetic layer 5 may be omitted.

Figure 4:
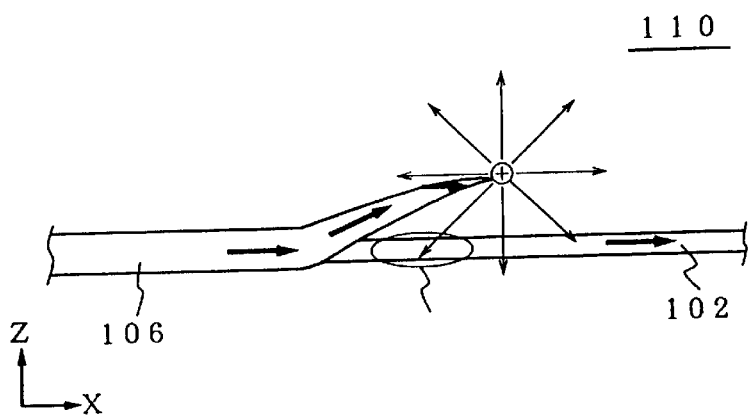
FIG. 4 is a schematic view explaining the content obtained by analyzing the configuration of the spin valve head in the prior art shown in FIG. 3.

FIG. 8 is a view showing only the hard film 6 and the free layer 2 in FIG. 7 to explain their positional relationship to the lower reproducing shielding 10, which correspond to FIG. 4 analyzing the configuration of the spin valve head in the prior art. With reference to FIG. 8, an effect which can be achieved by the clearance (g≧0) of more than zero provided between the orthographic projection of the hard film 6 onto the lower reproducing shielding and the orthographic projection of the free layer 2 onto the lower reproducing shielding will be explained. As shown in FIG. 8, the orthographically projected position P1, of the top end portion of the hard film 6 toward the free layer side, onto the lower reproducing shielding 12 is positioned on an outer side of the orthographically projected position P2, of the top end portion of the free layer 2 toward the hard layer side, onto the lower reproducing shielding 12 (if viewed from the center of the spin valve film).

Figure 5:
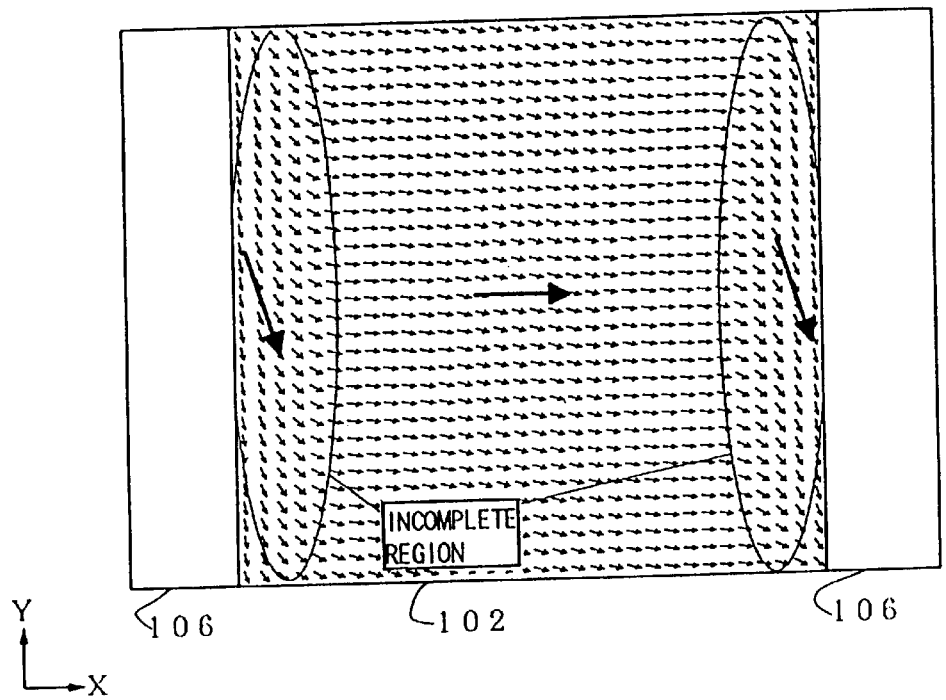
FIG. 5 is a view showing the distribution of magnetization in a free layer of a spin valve film, obtained by analyzing the configuration of the spin valve head in the prior art shown in FIG. 3 by virtue of micromagnetics simulation.

According to the configuration of the hard film 6 and the free layer 2, magnetic charges of the hard film 6 are concentrated onto the top end portion of the hard film so that the magnetic field generated radially from the top end portion thereof will be established. FIGS. 7 and 8 are sectional views, the spin valve film 10 has a predetermined depth dimension (Y-direction in FIG. 5), and therefore ideally the top end portion is formed linearly along the Y-direction. Hence, a radial magnetic field can be generated from the top end portion in the X-Y plane. More particularly, since the hard film 6 is provided on both sides of the spin valve film 11, one of the top end portions acts as an N pole from which the magnetic fields diverge radially, while the other of the top end portions acts as an S pole to which the magnetic fields converge radially.

The magnetization direction of the free layer 2 formed by the magnetic fields from the top end portions coincide with the magnetization direction (referred to as the "free layer magnetization direction" hereinafter) for magnetic domains control of the free layer 2 which is conducted by the hard film 6. Hence, no reverse magnetic field region exists therein.

On the contrary, in the spin valve film 110 in the prior art, since, as explained in connection with FIG. 4, the magnetization direction formed by the magnetic field from the top end portion of the hard film 106 is partially directed oppositely to the free layer magnetization direction, the reverse magnetic field region exists in the region wherein the free layer 102 overlaps with the hard film 106.

The clearance g in FIG. 8 is set to zero or a positive value, but too large clearance is not preferable since both the hard layer 6 and the free layer 2 are positioned far from each other and as a result the magnetic domain control of the free layer 2 by the hard film 6 becomes weak. Therefore, it is preferable that the clearance g should be set to a positive value which is close to zero as much as possible.

Figure 9:
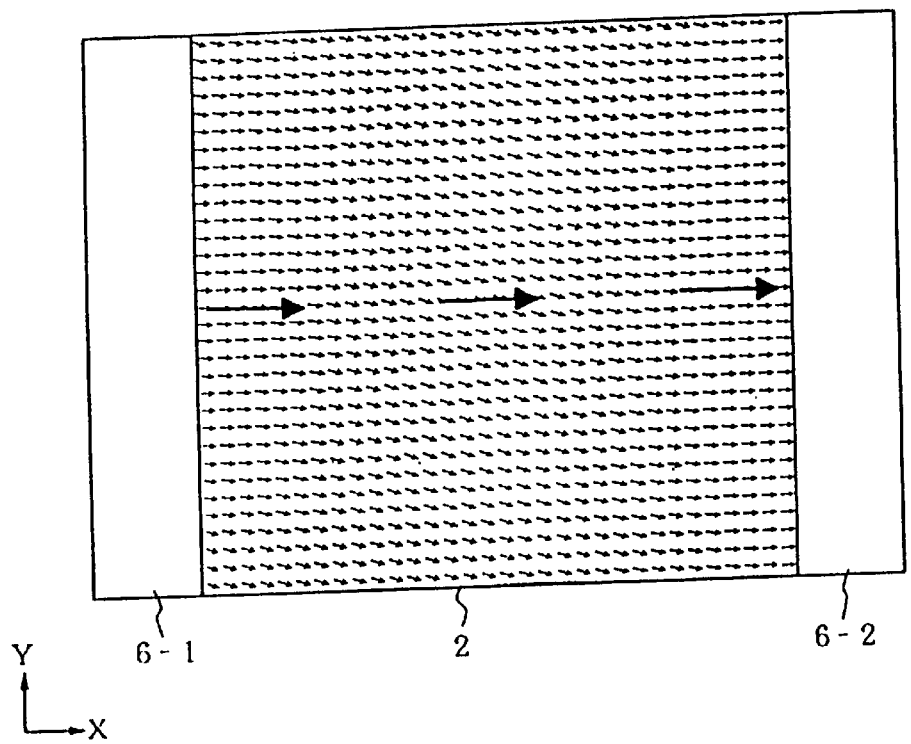
FIG. 9 is a view showing the distribution of magnetization in the free layer of the spin valve film, obtained by analyzing the configuration of the spin valve head shown in FIG. 7 by virtue of micromagnetics simulation.

As the spin valve film 10 according to the first embodiment, a sample in which the clearance g is set to zero has been manufactured by way of trial. FIG. 9 shows the distribution of magnetization in the free layer plane of the sample calculated by virtue of the computer simulation when no external signal magnetic field (i.e., no magnetic field by the recording medium) is applied, which corresponds to FIG. 5 analyzing the spin valve film in the prior art (refer to FIG. 3). This simulation has been made based on the micromagnetics simulation using the Landau-Lifshitz-Gilbert equation (LLG equation).

As shown in FIG. 9, the magnetization directions in respective regions are directed on the whole in the same direction uniformly in the free layer 2 surrounded by a pair of hard films 6-1, 6-2. Hence, the free layer 2 can be regarded as a single magnetic domain structure. The magnetization directions of the free layer having the single magnetic domain structure coincide with the free layer magnetization direction (indicated by a thick arrow) formed by the hard film 6.

Figure 6:
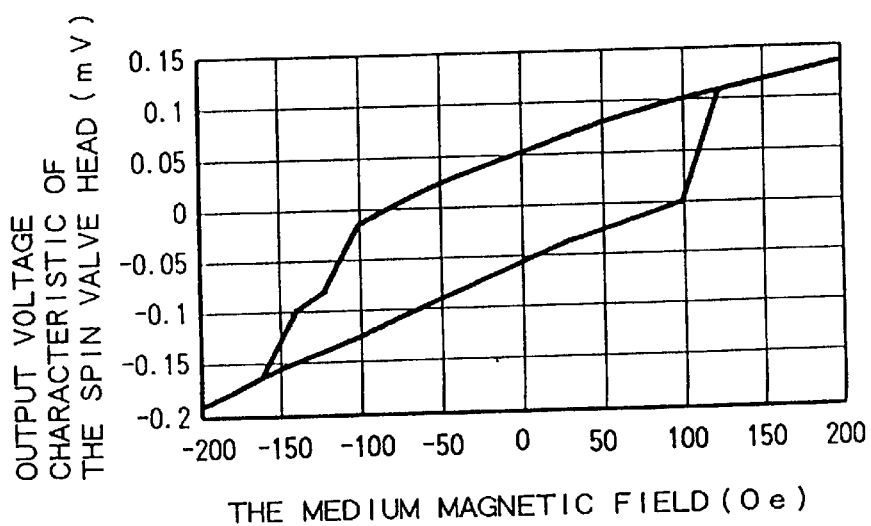
FIG. 6 is a graph showing the response output voltage characteristic of the spin valve head having incomplete single magnetic domains to a recording medium signal magnetic field, obtained by analyzing the configuration of the spin valve head in the prior art shown in FIG. 3 by virtue of the micromagnetics simulation.
Figure 10:
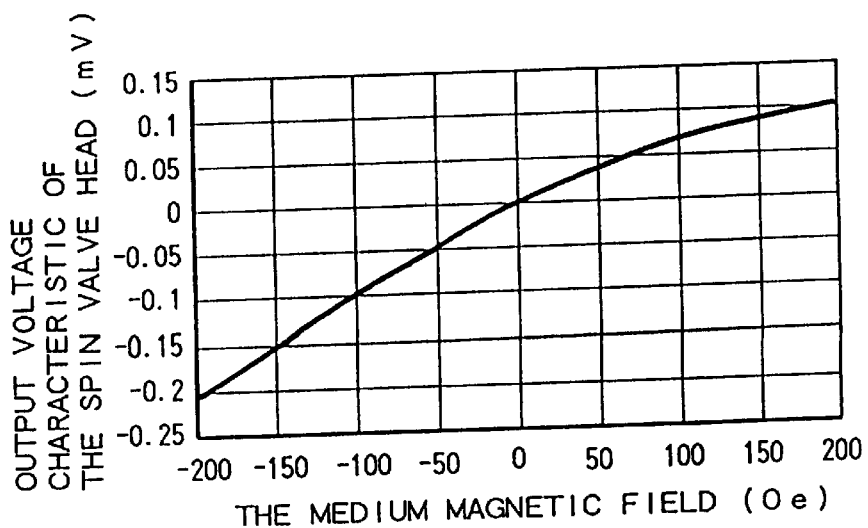
FIG. 10 is a graph showing the response output voltage characteristic of the spin valve head having a single magnetic domain to the recording medium signal magnetic field, obtained by analyzing the configuration of the spin valve head shown in FIG. 7 by virtue of the micromagnetics simulation.

FIG. 10 shows the response output voltage characteristic of the spin valve head 10 to the recording medium magnetic field (external magnetic field), obtained by the same computer simulation, which corresponds to FIG. 6 calculated by analyzing the spin valve film in the prior art (refer to FIG. 3). As can be seen from FIG. 10, the GMR output is 0.1 mV, 0 mV, and 0.07 mV, respectively, when the medium magnetic field is −100 oersted (Oe), 0 Oe, and 100 Oe. The hysteresis phenomenon which has appeared in FIG. 6 does not appear and as a result hysteresis loss can be ignored.

As above, by employing the configuration of the spin valve head shown in FIG. 7, the free layer 2 can be regarded as the single magnetic domain structure without the hysteresis phenomenon and as a result the Barkhausen noises can be reduced in the spin valve head.

Figure 11A:
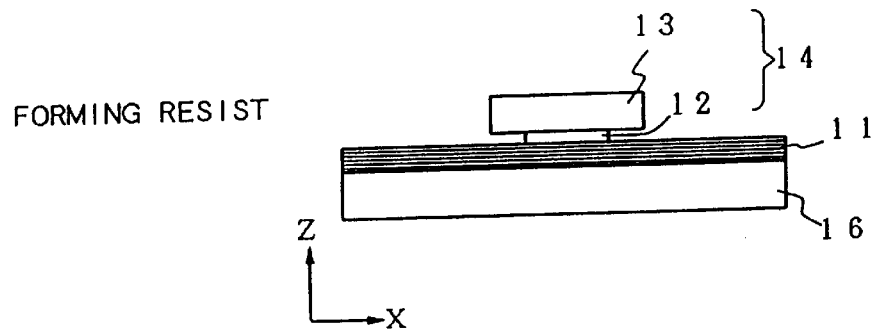
FIGS. 11A to 11D are sectional views showing steps of manufacturing the spin valve head shown in FIG. 7.
Figure 11B:
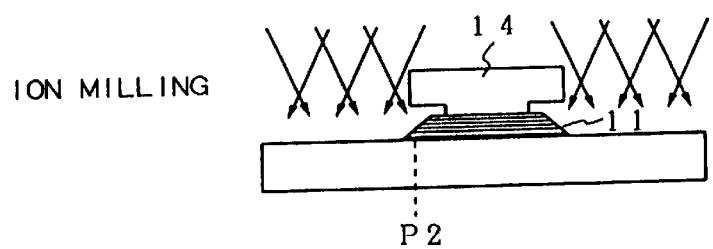
Figure 11C:
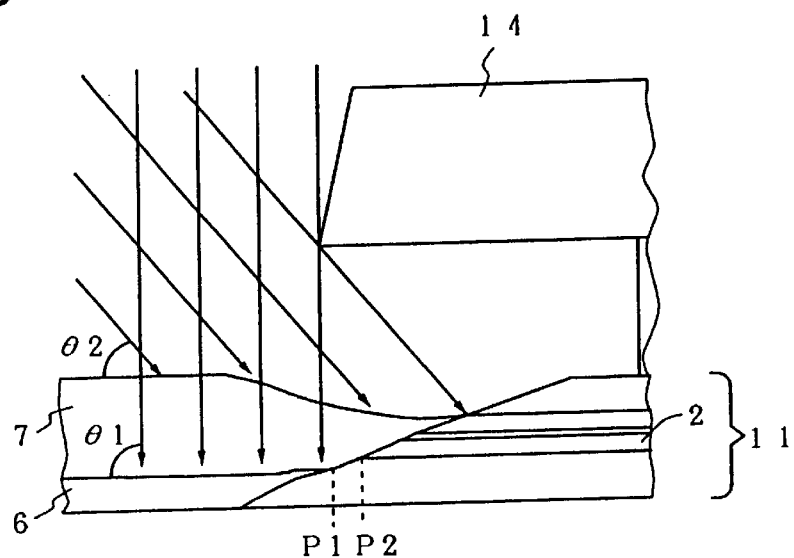
Figure 11D:
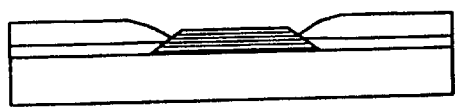

With reference to FIGS. 11A to 11D, a method of manufacturing the spin valve head according to the first embodiment shown in FIG. 7 will be explained. For easy understanding of explanation of a sputtering incident angle, etc., FIG. 11C is depicted in an enlarged manner rather than other drawings.

As shown in FIG. 11A, the underlying layer, the free layer, the nonmagnetic metal layer, the pinned layer, and the antiferromagnetic layer are laid in order on the insulating film (substrate) 16 to thus form the spin valve film 11. Then, a two-layer resist pattern 14 having overhanged shape is formed thereon. Specifically, a resist 12 is coated on an overall surface of the spin valve film 11 by the spin coating method and then an aluminum (Al2O3) layer 13 is formed on an overall resultant surface. After this, the resist 12 and the aluminum layer 13 are patterned by etching with using an appropriate mask. At this time, since the etching rate of the resist 12 is relatively quicker than that of the aluminum layer 13, a two-layer overhanged resist pattern 14 consisting of the aluminum layer 13 and the relatively narrow resist 12 formed below the aluminum layer 13 can be formed.

Then, as shown in FIG. 11B, the spin valve film 11 is patterned. Specifically, the spin valve film 11 not covered with the two-layer resist pattern 14 is removed by the ion milling method to form a planar rectangle. According to this removing step, the side end portion of the free layer 2 explained in connection with FIG. 8, i.e., the position P2 of the top end toward the hard film side is decided. In order to set the clearance g to zero or more, relative positions of the free layer top end portion and the top end portion P1 of the hard film 6 to be formed later becomes important. For this reason, it is preferable that the spin valve film 11 should be patterned slightly excessively such that the position P2 of the top end portion of the free layer 2 is positioned on the relatively inner side.

As shown in FIG. 11C, the hard film 6 is formed by the appropriate method such as sputtering and then the electrode film 7 is formed on the hard film 6 by the same method. At that time, it is important that the position P1 of the top end portion of the hard film 6 is not positioned on the inner side of the position P2 of the top end portion of the free layer. For example, in the film formation according to the sputtering, control of sputtering incident angles θ1, θ2 of the hard film 6 and the electrode film 7 can be achieved relatively simply, respectively.

For instance, the sputtering control angle FIG. 141 can be controlled by placing metal material for the hard film (sputtering source) and the spin valve head (target) at a relatively short distance and then carrying out the sputtering. Otherwise, the sputtering incident angle FIG. 141 can be controlled by placing a appropriate collimator between the sputtering source and the spin valve film as the target to direct flying directions of sputtering particles in one direction uniformly.

Then, as shown in FIG. 11C, the two-layer structure resist 14 can be lifted off by etching the spin valve film 11 by use of appropriate etchant such as acetone (CH3CoCH3). As a result, the spin valve head as shown in FIG. 7 can be manufactured.

A principal portion of the method of manufacturing the spin valve head according to the first embodiment described above consists of the following steps.

① Formation of the spin valve film 11

② Formation and ion milling patterning of the two-layer structure resist 14

③ Formation of the hard film 6 and the electrode film 7

④ Removal of the two-layer structure resist 14

In contrast to the above manufacturing steps, the spin valve heads may be manufactured by several different methods. According to these manufacturing methods, the spin valve heads having different structures can be accomplished.

Second Embodiment

In comparison to the first embodiment, the order of the steps of manufacturing a spin valve head according to a second embodiment of the present invention is changed.

Figure 12A:
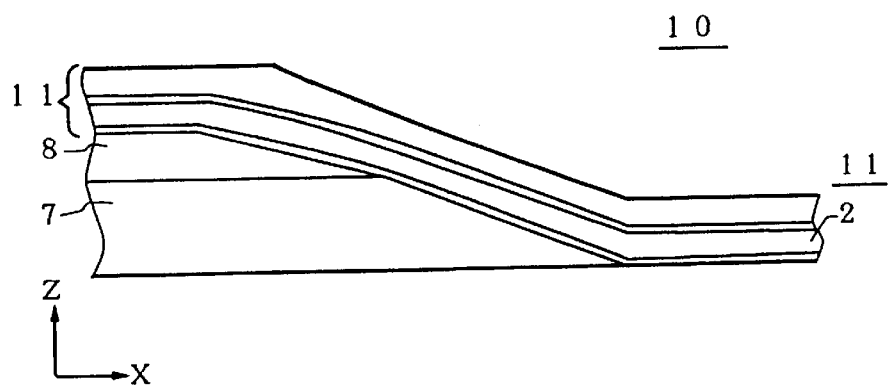
FIGS. 12A and 12B are sectional views showing a pertinent portion of a configuration of a spin valve head according to a second embodiment of the present invention respectively.
Figure 12B:
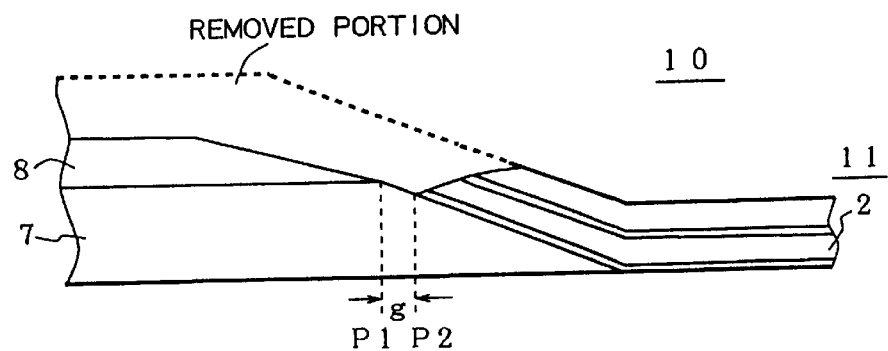

FIGS. 12A and 12B are views showing a pertinent portion of a configuration of a spin valve head according to a second embodiment of the present invention respectively. The second embodiment is a substitutional example wherein the order of above manufacturing steps are changed like ③→③ and the sequence of working processes in step ③ are further changed.

First, as shown in FIG. 12A, the electrode film 7 and the hard film 8 are formed on the substrate by sputtering etc. At this time, the electrode film 7 is formed first and the hard film 8 is then formed on the electrode film 7. Then, a spin valve forming region is removed therefrom by patterning. Then, the spin valve film 11 is formed. The spin valve can be formed by the method explained in connection with FIG. 7A.

Then, as shown in FIG. 12B, a portion of the spin valve film 11 above the hard film 8 is removed by patterning.

With the above, the spin valve head 10 in which the clearance g (where g≧0) is provided between the top end portion P1 of the hard film 8 and the top end portion P2 of the free layer 2 can be formed. In the configuration of the spin valve head 10 according to the second embodiment, the hard film 8 and the electrode film 7 are formed prior to the spin valve film 11 and further the hard film 8 is formed on the electrode film 7, which are different from the configuration of the spin valve head in FIG. 7.

Third Embodiment

FIG. 13 is a view showing a pertinent portion of a configuration of a spin valve head according to a third embodiment of the present invention. The third embodiment is an example wherein the order of above manufacturing steps are changed like ③→②→①→④ and the sequence of working processes in step ③ is further changed.

First, as shown in FIG. 13, the electrode film 7 and the hard film 8 are formed on predetermined regions on the substrate by sputtering etc. At this time, the electrode film 7 is formed first, and the hard film 8 is then formed on the electrode film 7, and the n the both films are patterned.

Then, the overhanged two-layer structure resist 14 is formed on the hard film 8. The resist 14 can be formed by the same method as that explained in connection with FIG. 7.

Then, the spin valve film 11 is formed in a spin valve forming region on the substrate. The spin valve film 11 can be formed by the same method as that explained in connection with FIG. 7. At this time, the sputtering incident angle θ1 should be controlled in free layer sputtering such that the clearance g (where g≧0) is provided between the top end portion P1 of the hard film and the top end portion P2 of the free layer can be formed.

Then, the two-layer structure resist 14 is lifted off.

With the above, the spin valve head 10 which has the clearance g (where g≧0) between the orthographic projection of the top end portion P1 of the hard film and that of the top end portion P2 of the free layer can be formed. In comparison with the configuration of the spin valve head in FIG. 7, in the configuration of the spin valve head according to the third embodiment, the hard film 8 and the electrode film 7 are formed prior to the spin valve film 11 and also vertical positions of the hard film 8 and the electrode film 7 are reversed.

Fourth Embodiment

Figure 14:
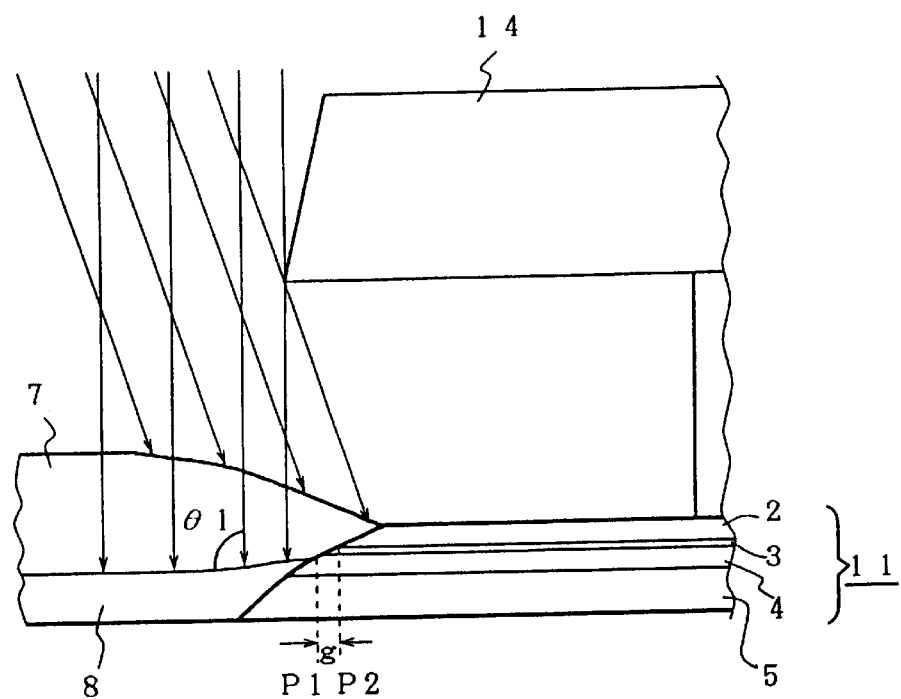
FIG. 14 is an enlarged sectional view showing a pertinent portion of a configuration of a spin valve head according to a fourth embodiment of the present invention.

FIG. 14 shows a pertinent portion of a configuration of a spin valve head according to a fourth embodiment of the present invention. The fourth embodiment is an example wherein the sequence of working processes is changed in spin valve film forming step of above step ①.

Specifically, the order of forming the spin valve film is reversed relative to that explained in connection to FIG. 7, i.e., the antiferromagnetic layer 5, the pinned layer 4, the nonmagnetic metal layer 3, and the free layer 2 are formed in order on the substrate.

Like the order of the steps explained in connection with FIG. 7, the succeeding steps are ② formation and ion milling patterning of the overhanged two-layer structure resist 14, ③ formation of the hard film 8 and the electrode film 7, and ④ removal of the two-layer structure resist 14.

By controlling the ion milling which decides the position P2 of the top end portion of the free layer of the spin valve film 11 and the hard film sputtering incident angle θ1 which decides the position P1 of the top end portion of the hard film, the spin valve head 10 in which the clearance g (where g≧0) is provided between the top end portion P1 of the hard film and the top end portion P2 of the free layer can be formed. In contrast to the configuration of the spin valve head in FIG. 7, the order of respective films constituting the spin valve film is reversed in the configuration of the spin valve head according to the fourth embodiment.

Fifth Embodiment

FIG. 15 shows a pertinent portion of a configuration of a spin valve head according to a fifth embodiment of the present invention. The fifth embodiment is an example wherein the sequence of working processes is changed in spin valve film forming step of above step ① and also the contents of the step of forming the electrode film and the hard film of the above step ③ are changed.

First, ① the spin valve film is formed by forming the antiferromagnetic layer 5, the pinned layer 4, the nonmagnetic metal layer 3, and the free layer 2 in order on the substrate. Then, ② formation of the overhanged two-layer structure resist 14 and patterning of the spin valve film 11 by virtue of ion milling are carried out. Then, ③ formation of the hard film 8 and the electrode film 7 is carried out. At that time, unlike the sequence explained in connection with FIG. 7, the electrode film 7 is formed first and the hard film 8 is formed next. Finally, ④ lift-off of the two-layer structure resist 14 is carried out.

By controlling the ion milling which decides the position P1 of the top end portion of the free layer of the spin valve film 11 and the hard film sputtering incident angle θ1 which decides the position P2 of the top end portion of the hard film, the spin valve head 10 in which the clearance g (where g≧0) is provided between the top end portion of the hard film and the top end portion of the free layer can be formed. In contrast to the configuration of the spin valve head in FIG. 7, in the configuration of the spin valve head according to the fifth embodiment, the vertical relationship between the hard film 8 and the electrode film 7 is different.

Sixth Embodiment

Figure 16:
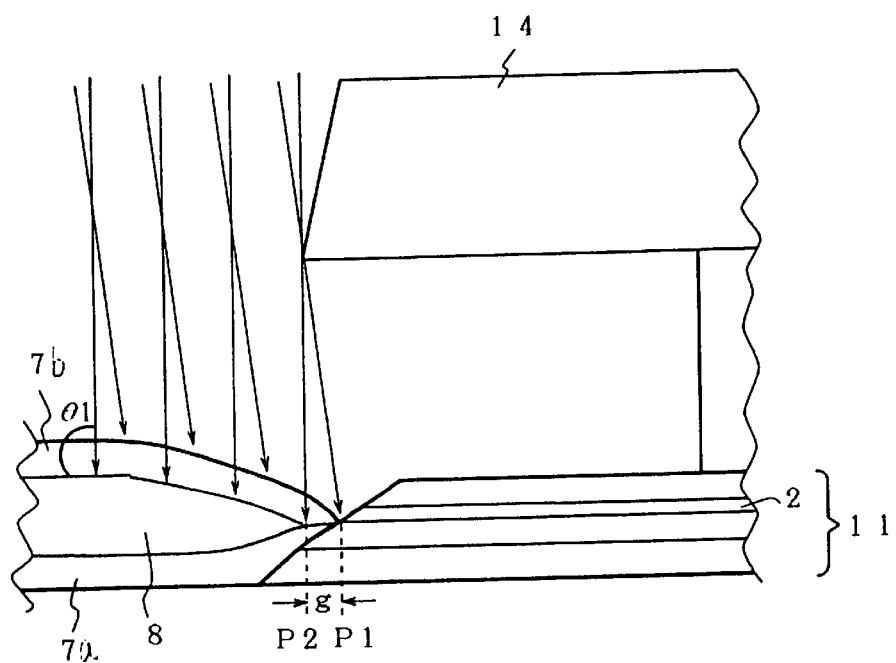
FIG. 16 is an enlarged sectional view showing a pertinent portion of a configuration of a spin valve head according to a sixth embodiment of the present invention.

FIG. 16 shows a pertinent portion of a configuration of a spin valve head according to a sixth embodiment of the present invention. The sixth embodiment is an example wherein the sequence of working processes is changed in spin valve film forming step of above step ① and also the contents of the step of forming the electrode film and the hard film of the above step ③ are changed.

At first, ① the spin valve film is formed by forming the antiferromagnetic layer 5, the pinned layer 4, the nonmagnetic metal layer 3, and the free layer 2 in order on the substrate. Then, ② formation of the overhanged two-layer structure resist 14 and patterning of the spin valve film 11 by virtue of ion milling are carried out. Then, ③ upon forming the hard film 8 and the electrode film 7, unlike the sequence explained in connection with FIG. 7, the electrode film 7a is formed first, the hard film 8 is formed second, and the electrode film 7b is formed once again. Finally, ④ lift-off of the two-layer structure resist 14 is carried out to remove it.

By controlling the ion milling which decides the position of the top end portion of the free layer of the spin valve film 11 and the hard film sputtering incident angle FIG. 141 which decides the position of the top end portion of the hard film, the spin valve head in which the clearance g in excess of zero is provided between the top end portion of the hard film and the top end portion of the free layer can be formed. In contrast to the configuration of the spin valve head in FIG. 7, in the configuration of the spin valve head according to the sixth embodiment, a three-layer structure in which upper and lower electrode films 7a,7b are formed to sandwich the hard film is employed.

Embodiment of the Magnetic Disk Drive

Figure 17:
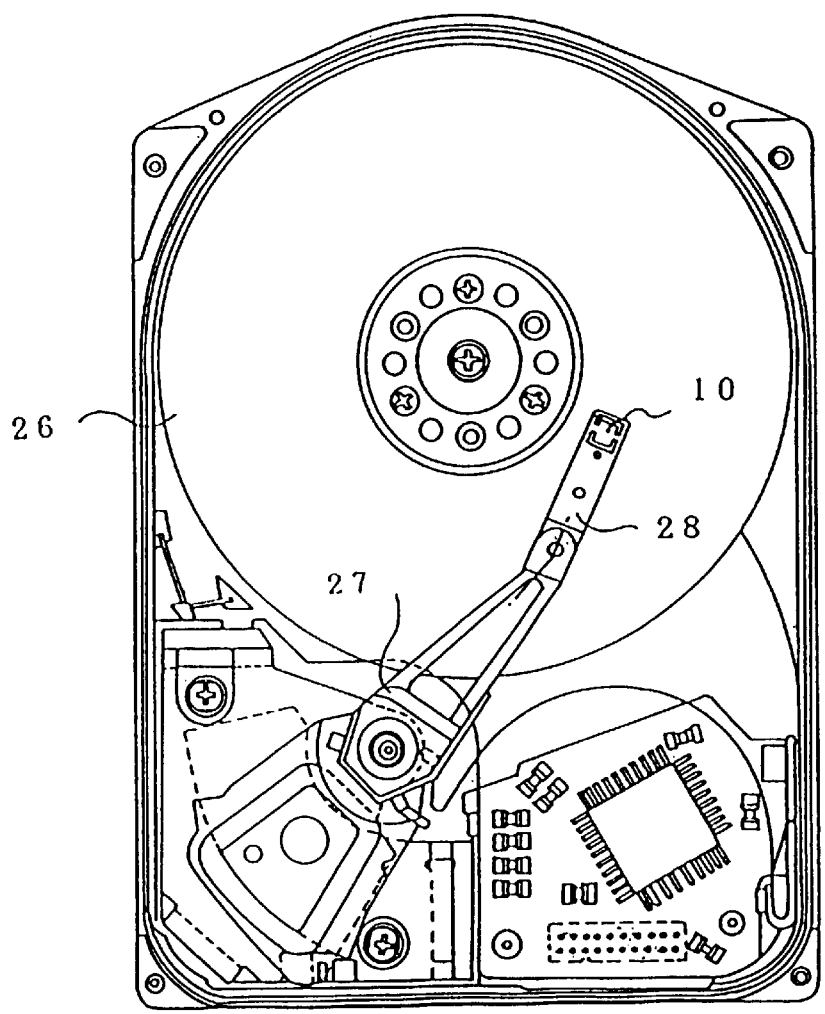
FIG. 17 is a plan view showing a magnetic disk drive using the spin valve head shown in FIG. 7.

FIG. 17 shows a magnetic disk drive 25 using the spin valve head 10 described above. On the magnetic disk drive 25 is installed a hard disk 26 serving as the magnetic recording medium. A actuator 27 is provided to track the head onto the narrow track of the hard disk 26. A slider 28 is provided to hold a tip of the actuator 27 on the hard disk at a low floating height and not to cause the actuator to be stuck against the hard disk. The above spin valve head 10 is attached to the top of the slider 28.

Advantage of the Invention

According to the present invention, a spin valve head which is capable of reducing a noise can be provided.

Further, according to the present invention, a method of manufacturing a spin valve head which is capable of reducing a noise can be provided.

Still further, according to the present invention, a magnetic disk drive using a spin valve head which is capable of reducing a noise can be provided.

Other Embodiments

Further, the present invention may be realized as the following embodiments in connection with the respective claims.

(1) A magnetic disk drive having a spin valve head set forth in claim 1, 3 or 6.

(2) A method of manufacturing a spin valve head comprising the steps of:

forming an electrode film and a hard magnetic layer in this order on a substrate by virtue of sputtering;

patterning the electrode film and the hard magnetic layer;

forming an underlying layer, a free magnetic layer, a nonmagnetic metal layer, a pinned magnetic layer, and an antiferromagnetic layer on the patterned hard magnetic layer and the substrate in this order to thus form a spin valve film; and removing a portion of the spin valve film positioned above the hard magnetic layer out of;

wherein the hard magnetic layer which is decided by the step of patterning the hard magnetic layer and the free magnetic layer which is decided by the step of removing the portion of the spin valve film above the hard magnetic layer are formed not to overlap with each other if viewed from the thickness direction of the spin valve film.

(3) A method of manufacturing a spin valve head comprising the steps of:

forming an electrode film and a hard magnetic layer in this order on a substrate by virtue of sputtering;

patterning the electrode film and the hard magnetic layer;

forming overhanged resists on the hard magnetic layer being patterned;

forming an underlying layer, a free magnetic layer, a nonmagnetic metal layer, a pinned magnetic layer, and an antiferromagnetic layer on the overhanged resists and the substrate in this order to thus form a spin valve film; and lifting off the overhanged resists;

wherein the hard magnetic layer which is decided by the step of patterning the hard magnetic layer and the free magnetic layer which is decided by the step of forming the spin valve film are formed not to overlap with each other if viewed from the thickness direction of the spin valve film.

(4) A method of manufacturing a spin valve head comprising the steps of:

forming an underlying layer, an antiferromagnetic layer, a pinned magnetic layer, a nonmagnetic metal layer, and a free magnetic layer on a substrate in this order to thus form a spin valve film;

forming overhanged resists on the spin valve film;

patterning the spin valve film by virtue of ion milling;

forming thereon a hard magnetic layer and an electrode film in this order by virtue of sputtering; and lifting off the overhanged resists;

wherein the free magnetic layer which is decided by the step of patterning the spin valve film and the hard magnetic layer which is decided by the step of forming the hard magnetic layer by virtue of sputtering are formed not to overlap with each other if viewed from the thickness direction of the spin valve film.

(5) A method of manufacturing a spin valve head comprising the steps of:

forming an underlying layer, an antiferromagnetic layer, a pinned magnetic layer, a nonmagnetic metal layer, and a free magnetic layer on a substrate in this order to thus form a spin valve film;

forming overhanged resists on the spin valve film;

patterning the spin valve film;

forming an electrode film and a hard magnetic layer in this order by virtue of sputtering; and lifting off the overhanged resists;

wherein the free magnetic layer which is decided by the step of patterning the spin valve film and the hard magnetic layer which is decided by the step of forming the hard magnetic layer by virtue of sputtering are formed not to overlap with each other if viewed from the thickness direction of the spin valve film.

(6) A method of manufacturing a spin valve head comprising the steps of:

forming an underlying layer, an antiferromagnetic layer, a pinned magnetic layer, a nonmagnetic metal layer, and a free magnetic layer on a substrate in this order to thus form a spin valve film;

forming overhanged resists on the spin valve film;

patterning the spin valve film;

forming an electrode film and a hard magnetic layer in this order by virtue of sputtering;

forming another electrode film on the hard magnetic layer by virtue of sputtering; and lifting off the overhanged resists;

wherein the free magnetic layer which is decided by the step of patterning the spin valve film and the hard magnetic layer which is decided by the step of forming the hard magnetic layer by virtue of sputtering are formed not to overlap with each other if viewed from the thickness direction of the spin valve film.

(7) A method of manufacturing a spin valve head according to any one of claims 9, 15, 17, 18, 19, 20 and 21, wherein the pinned magnetic layer is made of Co90Fe10, the nonmagnetic metal layer is made of Cu, the free magnetic layer is made of NiFe or/and Co90Fe10, the hard magnetic layer is made of CoCrPt, and the electrode elements are made of Au or W.

(8) A magnetic disk drive having a spin valve head which is manufactured by a method of manufacturing the spin valve head according to any one of claims 9, 15, 17, 18, 19, 20 and 21.

What we claimed is:

1. A spin valve head comprising:

a spin valve film including at least a free magnetic layer, a pinned magnetic layer, and a nonmagnetic layer formed between said free magnetic layer and said pinned magnetic layer;

a hard magnetic layer formed adjacent an end portion of said free magnetic layer for controlling magnetic domains of said free magnetic layer, said hard magnetic layer having a top end portion that is adjacent said end portion of said free magnetic layer and has a substantially sharp-pointed shape;

said free magnetic layer and said hard magnetic layer cooperatively defining a gap between said end portion of said free magnetic layer and said top end portion of said hard magnetic layer when viewed from a thickness direction of said spin valve film so that said hard magnetic layer and said free magnetic layer do not overlap each other when viewed in said thickness direction; and an electrode element abutting and applying a sense current to said spin valve film;

wherein each of said magnetic domains of said free magnetic layer have substantially a same direction of magnetization when there exists no external magnetic field;

wherein said direction of magnetization is substantially identical to a direction of a magnetic field that lies in said free magnetic layer where said magnetic field diverges from said top end portion of said hard magnetic layer.

2. A spin valve head according to claim 1, wherein said pinned magnetic layer is made of $Co_{90}Fe10$, the nonmagnetic metal layer is made of Cu, the free magnetic layer is made of at least one of NiFe and Co90Fe10, the hard magnetic layer is made of CoCrPt, and the electrode elements are made of Au or W.

3. The spin valve head according to claim 1, wherein said spin valve head further comprises:

an antiferromagnetic layer in said spin valve film for pinning a magnetization of said pinned magnetic layer; and two magnetic shielding films, one said shielding film covering said spin valve film and said electrode element with an insulating film interposed between said shielding film and said spin valve film, another said shielding film covering said hard magnetic layer with an insulating film interposed therebetween.

4. A spin valve head according to claim 3, wherein the antiferromagnetic layer is made of FeMn or PdPtMn, the pinned magnetic layer is made of Co90Fe10, the nonmagnetic metal layer is made of Cu, the free magnetic layer is made of NiFe or/and Co90Fe10, the hard magnetic layer is made of CoCrPt, the electrode elements is made of Au or W, the insulating layer is made of Al2O3, and the magnetic shielding films are made of NiFe or FeN.

5. A spin valve head comprising:

a spin valve film formed on a substrate, said spin valve film including at least a free magnetic layer, a pinned magnetic layer, and a nonmagnetic layer formed between said free magnetic layer and said pinned magnetic layer;

said free magnetic layer, said pinned magnetic layer and said nonmagnetic layer having substantially common side edges that cooperatively define a part of a side edge of said spin valve film;

said side edge of said spin valve film being tapered so as to be wider at a portion proximate said substrate than at a portion distal said substrate;

a hard magnetic layer for controlling magnetic domains of said free magnetic layer, said hard magnetic layer abutting and in contact with said side edge of said spin valve film and having a top end portion that abuts and is in contact with said side edge of said spin valve film;

said top end portion of said hard magnetic having a substantially sharp-pointed shape and being located below an upper surface of said free magnetic layer; and an electrode element in contact with at least one of the spin valve film and said hard magnetic layer for supplying a sense current to said spin valve film.

6. A spin valve head comprising:

a spin valve film formed on a substrate, said spin valve film including at least a free magnetic layer, a pinned magnetic layer, and a nonmagnetic layer formed between said free magnetic layer and said pinned magnetic layer;

an electrode element abutting and in contact with said spin valve film for supplying a sense current to the spin valve film; and a hard magnetic layer formed above said electrode element for controlling magnetic domains of said free magnetic layer, said electrode element and said hard magnetic layer having substantially common side edges which are tapered so as to be wider at a portion proximate said electrode element than at a portion distal said electrode element;

said spin valve film having an end region that is formed on said side edge of said electrode element, said end region including a side edge of said free magnetic layer;

said hard magnetic layer having an end portion that is adjacent to said side edge of said free magnetic layer;

said end portion of the hard magnetic layer having a substantially sharp-pointed shape and being located above a lower surface of said free magnetic layer.

7. A spin valve head comprising:

a spin valve film formed on a substrate, said spin valve film including at least a free magnetic layer, and a pinned magnetic layer;

a nonmagnetic layer formed between said free magnetic layer and said pinned magnetic layer;

said free magnetic layer and said pinned magnetic layer and the nonmagnetic layer having substantially common side edges that cooperatively define a part of a side edge of said spin valve film;

said side edge of said spin valve film being declined and descending toward said substrate;

an electrode element abutting and in contact with the spin valve film for supplying a sense current to the spin valve film, said electrode element covering a part of said spin valve film; and a hard magnetic layer adjacent to said spin valve film for controlling magnetic domains of the free magnetic layer, said hard magnetic layer having a top end portion that is a substantially sharp-pointed shape;

said top end portion of said hard magnetic layer abutting the side edge of said spin valve film via the electrode element and being located bellow an upper surface of said free magnetic layer.

* * * * *

UNITED STATES PATENT AND TRADEMARK OFFICE
CERTIFICATE OF CORRECTION

PATENT NO. : 6,094,325
DATED : July 25, 2000
INVENTOR(S) : Tagawa et al.

It is certified that error appears in the above-indentified patent and that said Letters Patent is hereby corrected as shown below:

Column 18, line 29, delete "elements" and insert --element-- therefor

Column 20, line 19, delete "bellow" and insert --below-- therefor

Signed and Sealed this

Seventeenth Day of April, 2001

Attest:

NICHOLAS P. GODICI

Attesting Officer     Acting Director of the United States Patent and Trademark Office